May 26, 1953 — R. W. KETCHLEDGE — 2,640,137
TEMPERATURE CONTROL SYSTEM
Filed Nov. 15, 1950 — 2 Sheets-Sheet 1

INVENTOR
R. W. KETCHLEDGE
BY
ATTORNEY

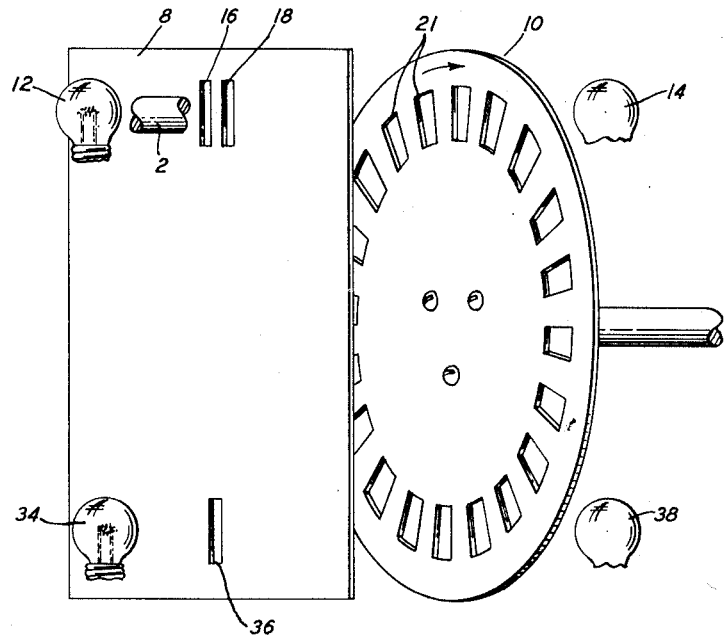
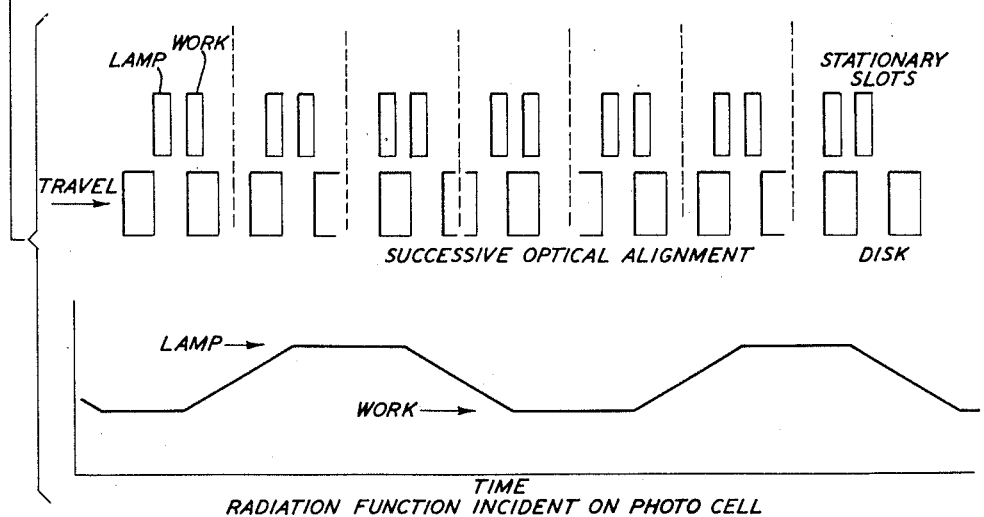

Patented May 26, 1953

2,640,137

UNITED STATES PATENT OFFICE 2,640,137

TEMPERATURE CONTROL SYSTEM

Raymond W. Ketchledge, Middlesex, N. J., assignor to Bell Telephone Laboratories, Incorporated, New York, N. Y., a corporation of New York Application November 15, 1950, Serial No. 195,821

6 Claims. (Cl. 219—20)

This invention relates to temperature control systems wherein the temperature of a furnace is controlled in accordance with the energy radiated by an object heated thereby, and particularly to a system wherein the radiation from the heated object is compared with the radiation from a standard source to control the energy delivered to the object by the furnace.

In the manufacture of equipment such as is used in the communications field many brazing operations are employed and it is essential that these operations be carried out with accurate temperature control. For example, the end seals of a submarine cable repeater container may be assembled by a series of silver soldering operations within the container. Brazes of this type, which are hidden from direct view and must therefore be controlled automatically, may be in close proximity to rubber insulation where it is essential that the braze be completed rapidly to avoid excessive heating of the rubber. Some brazes may also be required on material having a thickness of the order of 0.032 inch which material would, of course, deform if heated at the required brazing temperature for an excessive length of time, or if overheated beyond the required brazing temperature at any point of the material.

Requirements such as these indicate the desirability of using a relatively high-power induction heater to bring the work up to brazing temperature quickly and a control system which will reduce the power upon reaching the desired temperature at the hottest portion of the work to avoid overheating, and will maintain the hottest portion of the work at the desired temperature to permit closely controlled brazes to be made.

It is accordingly an object of this invention to provide an induction heating means for brazing comprising a control system which will assure that the temperature of the radiating surface of the heated object will not exceed, or overshoot, a predetermined value.

It is a further object of this invention to provide means for completing a braze rapidly comprising a control system which will assure that the time required for all parts of the heated object to have reached a predetermined temperature will be dependent solely on the thermal time constant of the object.

In accordance with this invention the above-noted requirements and objectives are satisfactorily met by the use of a novel photocell comparison method. A spinning slotted disk is employed as an optical commutator to switch the photocell view back and forth between the heated object, or workpiece, and a standard lamp. The photocell looks through the spinning disk and through one of two slots in a stationary plate at the standard lamp filament, and through the spinning disk and through the other slot at the work. When the work and the lamp radiations are in balance, a constant illumination falls on the photocell.

The resulting comparison signal wave is amplified and fed to a phase sensitive rectifier. A reference wave of suitable magnitude to perform the switching function within the rectifier is obtained from a separate lamp radiating through another portion of the rotating slotted disk onto a second photocell. The function of the phase sensitive rectifier is to produce a direct-current voltage of magnitude and polarity proportional to the temperature unbalance between the workpiece and the standard lamp.

The rectified comparison signal is then applied to a direct-current amplifier whose gain rises with frequency to compensate for the response characteristic of the generator which furnishes energy for heating the workpiece, and whose bias setting is adjusted to provide power to hold the workpiece at the desired temperature when the value of the comparison signal is zero. The output of the direct-current amplifier is employed to vary the field current of the generator and thereby control the power delivered by said generator.

The cycle which turns off the power is initiated by the opening of a solder melt detector circuit. This circuit comprises one or more solder wires held by spring pressure against the inside of the work and so arranged that when the inside of the work reaches the required temperature the wire or wires melt and allow the spring to swing them clear of the work thereby opening an electrical circuit. This initiates a time delay cycle whose completion results in placing a high negative bias on the direct-current amplifier and causing the generator field power to be removed.

The nature of the invention and its distinguishing features and advantages will be more clearly understood from the following detailed description and the accompanying drawings in which:

Fig. 2 is a view in perspective of the optical commutator and

Fig. 3 is a diagram showing the optical commutation cycle.

Figure 1:
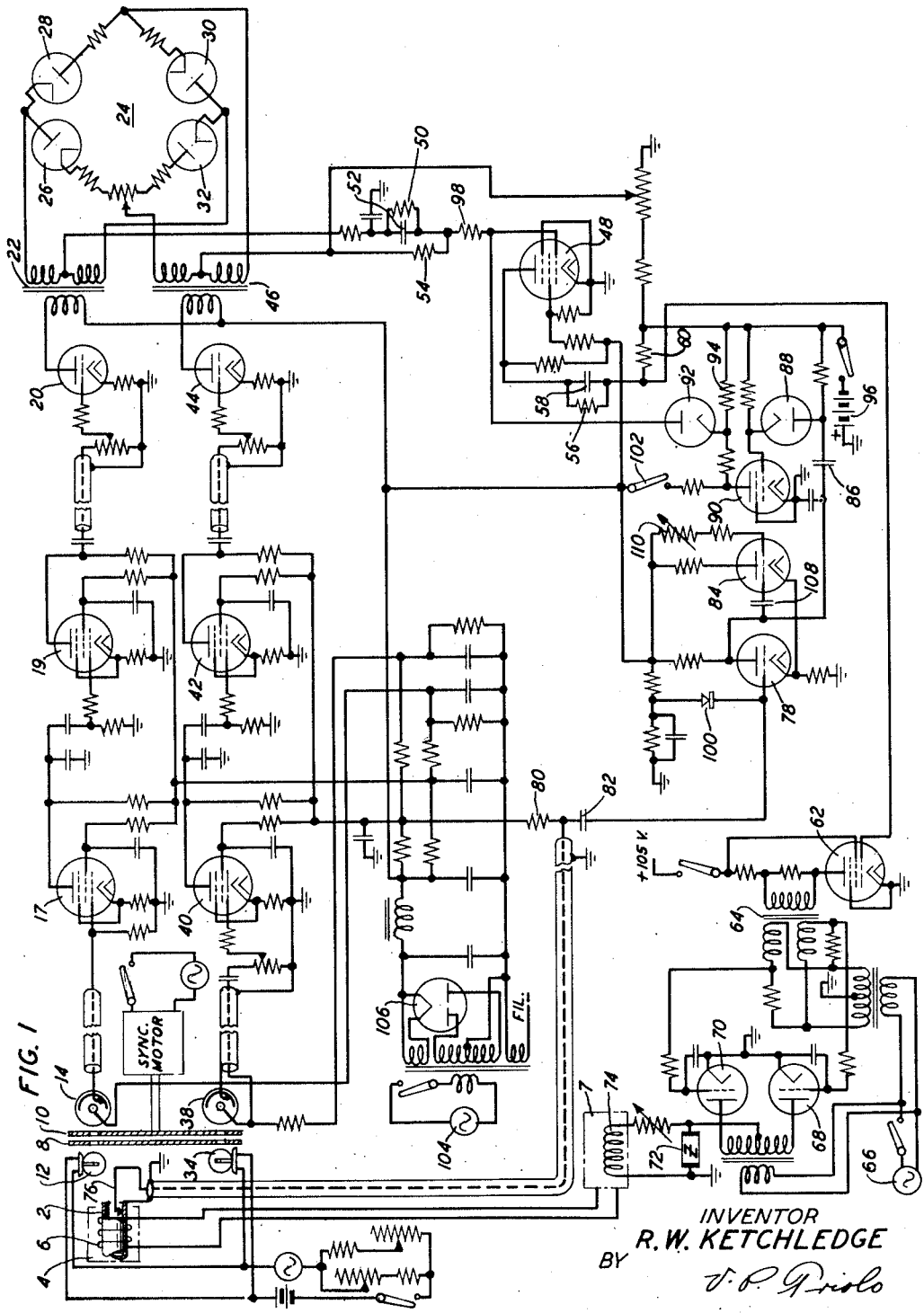
Fig. 1 is a schematic showing the optical commutator arrangement and temperature control circuits as employed in a preferred embodiment of this invention.

A workpiece 2 is located within a furnace 4 which is shown, for purposes of illustration, as being of the induction type, having an inducing coil 6 connected to and energized by the generator 7. A spinning slotted disk 10 is used as an optical commutator to switch the view of the photocell 14 back and forth between the heated workpiece 2 and a standard lamp 12. The spinning disk is located between the photocell 14 and a stationary plate 8. In the stationary plate 8 are two slots 16 and 18 which, in the preferred embodiment of this invention, are ⅛ inch wide and are spaced ⅛ inch between adjacent edges. The spinning disk 10 has 20 slots, 21, which are ¼ inch wide and ¼ inch between adjacent edges. As shown in Fig. 2, the disk slots are cut along radii and are therefore not quite rectangular. The slots in the stationary plate are aligned with those of the disk, with the standard lamp 12 behind stationary slot 16, and the hottest portion of the work, that portion which is directly inside the heating coil 6, behind the stationary slot 18. As a disk slot 21 scans across the two stationary slots 16 and 18, successive positions, as shown on Fig. 3, cause the wave shape shown on Fig. 3 to be incident on the photocell 14. This commutation method causes no switching transients. When the work and the lamp radiations are in balance, only a constant illumination falls on the photocell 14. There are no transients to overload the following amplifiers when the optical system indicates balance.

The comparison signal coming from the photocell 14, as a result of the response of said photocell to the radiations from the work and the standard lamp, is passed through preamplifiers 17 and 19, amplifier 20, which may be one-half of a dual triode such as the 6SN7 tube, and transformer 22 to a phase sensitive rectifier 24, which comprises four rectifying elements 26, 28, 30, 32, which may be of the copper-oxide type or diode vacuum tubes, poled in the same direction in a closed circuit. For the functioning of the phase sensitive rectifier 24, which is of the type described in Patent 2,434,273 granted to me on January 13, 1948, a commutating or reference wave of suitable magnitude and of a frequency equal to that of the comparison signal wave is obtained from a separate lamp 34 radiating through another slot 36 in the stationary plate 8 and through another portion of the slotted spinning disk 10 onto a second photocell 38. The reference signal coming from photocell 38 is passed through preamplifiers 40 and 42, amplifier 44, which may be the other half of the dual triode noted above, and transformer 46 to the phase sensitive rectifier 24.

The output of the phase sensitive rectifier 24 is a unidirectional voltage of magnitude proportional to the magnitude of the alternating voltage comparison signal and of polarity varying in accordance with the polarity or phase of said comparison signal. The unidirectional voltage is then applied to the direct-current amplifier 48. The bias of this amplifier is adjusted to provide power to hold the workpiece at the desired temperature when the value of the unidirectional voltage is zero. The amplifier will provide for an increase in power to raise the temperature of the workpiece only when the unidirectional voltage applied thereto is of a polarity which represents a temperature unbalance caused by the workpiece being at a lower temperature than the standard lamp. Should there be occasion to overshoot the desired temperature at the workpiece and thereby create an unbalance wherein the workpiece is at a higher temperature than the standard lamp, the polarity or phase of the alternating voltage signal applied to the phase sensitive rectifier would be 180 degrees out of phase with the polarity of the signal normally obtained. This polarity change would be reflected in the rectified signal by the phase sensitive rectifier, and the amplifier 48 would be biased off by the application of said signal.

It is desirable, especially where workpieces of varying size and alloy composition are to be heated, that the gain-frequency characteristic of the servo-loop in the control system be controlled solely by the thermal time constant of the particular workpiece being heated. In order to achieve this desirable condition whereby the gain-frequency characteristic of the servo-loop will be that of a single time constant and the servo-loop will not hunt or oscillate, the gain-frequency characteristic of amplifier 48 is adjusted to compensate for the response characteristic of the generator supplying power to heat the workpiece. This generator response characteristic is principally due to the inductance of the field which causes the delivered power to lag the application of voltage to the field, and in the machine employed in the preferred embodiment of this invention it was found that the time constant was approximately one second. In order to compensate for the one-second lag of the generator the network comprising the resistor 50, the capacitor 52 and the resistance 54, and the network comprising the resistor 56, the capacitor 58 and the resistor 60 are employed to provide amplifier 48 with a gain-frequency characteristic which is the inverse of the one-second time constant of the generator. Thus, the gain is increased with frequency up to approximately three cycles per second where it levels off. This holds the overall frequency characteristics of the servo system, exclusive of the workpiece, relatively flat up to a few cycles, and the thermal time constant of the work itself is the parameter that controls the frequency cutoff of the servo-loop. It is to be noted that this feature is most important since the effective frequency characteristic of the work may be far from constant. Firstly, the radiation from the work varies as the fourth power of the temperature. Secondly, the rapidity of cooling of a narrow hot band is much faster than the cooling rate when a large amount of the work has been heated. Thus, the servo-loop must be stable over a wide range of effective work time constants. It has been found that the embodiment of this invention, as shown in Fig. 1, is stable under all conditions of operation and shows, under the most severe conditions, negligible hunting action. It is recognized that the continued application of 40 kilowatts will melt a copper tubing having a wall thickness of .032 inch. However, despite the low thermal capacity and short effective time constant of copper tubing, having a wall thickness of .032 inch, it has been possible, with this invention to apply 40 kilowatts to said tubing and to hold the tubing at a desired temperature.

The direct-current control signal from amplifier 48 is applied to amplifier 62. Amplifier 62 passes current through the saturable reactor 64 which controls the phase angle of the sixty cycles per second signals applied from source 66 to the grids of thyratrons 68 and 70. Thyratrons 68 and 70 control the generator field 74, by delivering a direct-current output which varies with the bias applied to amplifier 62. A thyrite element 72 is employed to protect the generator field should the system cut off the field current suddenly. Thus, the generator field 74 is controlled by a direct current which, in the preferred embodiment of this invention, varies the field current from zero to three amperes as the input signal varies from −7 to −4 volts, the greater portion of the variation being between —5.5 and —4 volts.

The cycle which turns off the power is initiated by the opening of a solder melt detector circuit. The solder melt detector comprises one or more solder wires 76, held by spring pressure against the inside of the workpiece and so arranged that when the inside of the workpiece becomes hot enough the wire or wires 76 melt and allow the spring to swing them clear of the work. When contact between the workpiece and the solder wire is broken the ground connection to the grid of tube 78 is broken and a positive potential is applied to said grid through the resistor 80 and the capacitor 82. This causes the flip-flop circuit comprising tubes 78 and 84 to trigger. After condenser 108 has discharged sufficiently through adjustable resistance 110 the circuit restores and fires a pulse which is transmitted through capacitor 86 to the diode 88. The diode 88 furnishes a positive pulse to the gas tube 90 which then conducts, and through diode 92, places a high negative bias on the grid of the amplifier 48. This biases off the amplifier 48 and thereby causes the generator field power to be removed except for a negligible amount of power due to residual magnetization of the field itself. The diode 92 effectively short-circuits the control grid of amplifier 48 through resistor 94 and the battery 96, while the resistor 98, which has a value of the order of two megohms, prevents the comparison signal, which would become quite large on removing the generator power, from affecting the control grid of amplifier 48. The delay between the opening of the solder melt detector and the removal of power may be varied to suit the work by adjusting resistor 110.

The varistor 100 is employed to prevent erroneous tripping of the circuit comprising tubes 78 and 84 should the solder melt detector circuit again become closed after opening. Thus, the solder melt detector need only open-circuit momentarily to initiate the cycle.

The switch 102 is employed to reset the gas tube 90 by opening the plate circuit thereof.

Plate and filament voltages for the control circuits are provided by a conventional power supply comprising the source 104 and the rectifier 106.

It is to be understood that the above-described arrangements are illustrative of the application of the principles of the invention. Other arrangements may be devised by those skilled in the art without departing from the spirit and scope of the invention.

What is claimed is:

1. In furnace control apparatus, a workpiece having outer and inner surfaces, furnace means for electrically heating the inner surface of said workpiece to a predetermined temperature, a fixed radiation source, a radiation sensitive element positioned to receive radiations from the outer surface of said workpiece and from said fixed source, means for alternately directing radiations from the outer surface of said workpiece and from said fixed source upon said element to produce direct-current voltages of different amplitudes, means for changing said direct-current voltages into an alternating voltage the phase of which and the magnitude of the positive and negative portions of which vary in accordance with the magnitude of radiations received from the outer surface of said workpiece and from said fixed source, means for rectifying said alternating voltage to produce a unidirectional voltage the magnitude of which is proportional to the magnitude of said alternating voltage and the polarity of which varies in accordance with the phase of said alternating voltage, a space discharge device having input and output circuits, means for impressing said unidirectional voltage and a substantially constant biasing voltage on said input circuit to produce a current of varying magnitude in said output circuit, means responsive to the current in said output circuit for varying the energy level of said furnace means in accordance with the magnitude of said current, and for deenergizing said furnace means when the magnitude of said current is substantially zero, a source of potential, means responsive to the attainment of said predetermined temperature at said inner surface for applying potential from said source to said input circuit to cause said biasing voltage to assume a new value and thereby cause the magnitude of the current in said output circuit to become substantially zero.

2. In furnace control apparatus, a workpiece having outer and inner surfaces, furnace means for electrically heating the inner surface of said workpiece to a predetermined temperature, said furnace means being energized by a generator connected thereto, a fixed radiation source, a radiation sensitive element positioned to receive radiations from the outer surface of said workpiece and from said fixed radiation source, means for alternately directing radiations from the outer surface of said workpiece and from said fixed radiation source upon said element to produce direct-current voltages of different amplitudes, means for changing said direct-current voltages into an alternating voltage the phase of which and the magnitude of the positive and negative portions of which vary in accordance with the magnitude of radiations received from the outer surface of said workpiece and from said fixed radiation source, means for rectifying said alternating voltage to produce a unidirectional voltage the magnitude of which is proportional to the magnitude of said alternating voltage and the polarity of which varies in accordance with the phase of said alternating voltage, an amplifier having input and output circuits, means for impressing said unidirectional voltage and a substantially constant biasing voltage on said input circuit to produce a current of varying magnitude in said output circuit, means responsive to the current in said output circuit for varying the energy output of said generator in accordance with the magnitude of said current and for deenergizing said generator when the magnitude of said current is substantially zero, a source of potential, means responsive to the attainment of said predetermined temperature at said inner surface for applying potential from said source to said input circuit to cause said biasing voltage to assume a new value and thereby cause the magnitude of the current in said output circuit to become substantially zero, said generator having a rate of response to said energy output varying means which decreases as the frequency of variation in the magnitude of said unidirectional voltage increases, said amplifier comprising means for increasing its gain as the frequency of variation in the magnitude of said unidirectional voltage increases to compensate for the change in the rate of response of said generator.

3. In furnace control apparatus, a workpiece having outer and inner surfaces, furnace means for electrically heating the inner surface of said workpiece to a predetermined temperature, a fixed radiation source, a radiation sensitive element positioned to receive radiations from the outer surface of said workpiece and from said fixed source, means for alternately directing radiations from the outer surface of said workpiece and from said fixed source upon said element to produce direct-current voltages of different amplitudes, means for changing said direct-current voltages into an alternating voltage the phase of which and the magnitude of the positive and negative portions of which vary in accordance with the magnitude of radiations received from the outer surface of said workpiece and from said fixed source, means for rectifying said alternating voltage to produce a unidirectional voltage the magnitude of which is proportional to the magnitude of said alternating voltage and the polarity of which varies in accordance with the phase of said alternating voltage, a space discharge device having input and output circuits, means for impressing said unidirectional voltage and a substantially constant biasing voltage on said input circuit to produce a current of varying magnitude in said output circuit, means responsive to the current in said output circuit for varying the energy level of said furnace means in accordance with the magnitude of said current, and for deenergizing said furnace means when the magnitude of said current is substantially zero, means for causing said biasing voltage to assume a new value and thereby cause the magnitude of the current in said output circuit to become substantially zero when said inner surface of said workpiece reaches said predetermined temperature, said means comprising a source of negative potential, circuit means for connecting said source of negative potential with the input circuit of said space discharge device, a source of electrical energy, a pulse generating means, and a gas tube, the conductivity of said circuit means between said source of negative potential and said input circuit being dependent on the conductivity of said gas tube, the conductivity of said gas tube being dependent on a pulse generated by said pulse generating means, said pulse generating means, actuatable on the application thereto of energy from said source of electrical energy, being connected to said gas tube, said gas tube being connected to said circuit means, and means responsive to the attainment of said predetermined temperature at said inner surface for applying energy from said source of electrical energy to said pulse generating means.

4. Furnace control apparatus in accordance with claim 3 wherein the pulse generating means comprises a time delay means for defining the time interval between the energization of said pulse generating means and the generation of the pulse by said means which causes the gas tube to conduct.

5. In furnace control apparatus, a workpiece having outer and inner surfaces, furnace means for electrically heating the inner surface of said workpiece to a predetermined temperature, said furnace means being energized by a generator connected thereto, a fixed radiation source, a radiation sensitive element positioned to receive radiations from the outer surface of said workpiece and from said fixed radiation source, means for alternately directing radiations from the outer surface of said workpiece and from said fixed radiation source upon said element to produce direct-current voltages of different amplitudes, means for changing said direct-current voltages into an alternating voltage the phase of which and the magnitude of the positive and negative portions of which vary in accordance with the magnitude of radiations received from the outer surface of said workpiece and from said fixed radiation source, means for rectifying said alternating voltage to produce a unidirectional voltage the magnitude of which is proportional to the magnitude of said alternating voltage and the polarity of which varies in accordance with the phase of said alternating voltage, an amplifier having input and output circuits, means for impressing said unidirectional voltage and a substantially constant biasing voltage on said input circuit to produce a current of varying magnitude in said output circuit, means responsive to the current in said output circuit for varying the energy output of said generator in accordance with the magnitude of said current and for deenergizing said generator when the magnitude of said current is substantially zero, means for causing said biasing voltage to assume a new value and thereby cause the magnitude of the current in said output circuit to become substantially zero when said inner surface of said workpiece reaches said predetermined temperature, said means comprising a source of negative potential, circuit means for connecting said source of negative potential with the input circuit of said amplifier, a source of electrical energy, a pulse generating means, and a gas tube, the conductivity of said circuit means between said source of negative potential and said input circuit being dependent on the conductivity of said gas tube, the conductivity of said gas tube being dependent on a pulse generated by said pulse generating means, said pulse generating means, actuatable on the application thereto of energy from said source of electrical energy, being connected to said gas tube, said gas tube being connected to said circuit means, and means responsive to the attainment of said predetermined temperature at said inner surface for applying energy from said source of electrical energy to said pulse generating means, said generator having a rate of response to said energy output varying means which decreases as the frequency of variation in the magnitude of said unidirectional voltage increases, said amplifier comprising means for increasing its gain as the frequency of variation in the magnitude of said unidirectional voltage increases to compensate for the change in the rate of response of said generator.

6. Furnace control apparatus in accordance with claim 5 wherein the pulse generating means comprises a time delay means for defining the time interval between the energization of said pulse generating means and the generation of the pulse by said means which causes the gas tube to conduct.

RAYMOND W. KETCHLEDGE.

References Cited in the file of this patent

UNITED STATES PATENTS

| Number | Name | Date |
|---|---|---|
| 1,970,103 | Runaldue | Aug. 14, 1934 |
| 1,976,461 | Prince | Oct. 9, 1934 |
| 1,985,805 | Spire | Dec. 25, 1934 |
| 2,096,323 | Gille | Oct. 19, 1937 |
| 2,136,682 | Gilbert | Nov. 15, 1938 |
| 2,324,525 | Mittlemann | July 20, 1943 |
| 2,404,147 | Strickland | July 16, 1946 |